United States Patent [19]

Björkman

[11] Patent Number: 5,040,891
[45] Date of Patent: Aug. 20, 1991

[54] LASER-WARNING METHOD AND APPARATUS

[75] Inventor: Bengt Björkman, Järfälla, Sweden

[73] Assignee: Bofors Electronics AB, Jarfalla, Sweden

[21] Appl. No.: 515,128

[22] Filed: Apr. 27, 1990

[30] Foreign Application Priority Data

Apr. 28, 1989 [SE] Sweden .................................. 8901554

[51] Int. Cl.$^5$ .......................... G01C 1/00; G01N 21/00
[52] U.S. Cl. .................................... 356/141; 356/340; 356/341; 340/557
[58] Field of Search .................... 356/1, 141, 152, 338, 356/340, 341; 89/41.06; 364/423, 900, 922.5; 340/557; 250/216

[56] References Cited

U.S. PATENT DOCUMENTS

| | | |
|---|---|---|
| 4,687,923 | 8/1987 | Bauck . |
| 4,847,481 | 7/1989 | Altmann .......................... 356/152 X |
| 4,867,556 | 9/1990 | Björkman ................................ 356/1 |

FOREIGN PATENT DOCUMENTS

| | | |
|---|---|---|
| 269142 | 1/1988 | European Pat. Off. . |
| 2151871 | 7/1985 | United Kingdom . |

Primary Examiner—Linda J. Wallace
Attorney, Agent, or Firm—Pollock, Vande Sande & Priddy

[57] ABSTRACT

Laser-warning method and a laser-warning arrangement, which laser-warning arrangement is intended to warn of laser light from a laser beam source which is used for guiding projectiles, missiles and the like, for example laser light from a pulsed laser beam which is directed towards a target area. The time for the laser beam to reach the laser-warning arrangement, the so-called impact time, is calculated from a first amplitude value, measured at a first point in time, of the scattered light from the laser beam and a second amplitude value, measured at a second point in time, of the scattered light from the laser beam, and the measured time difference between the said first and second points in time on the basis that the amplitude raised to a constant is proportional to the distance to the laser beam according to the equation $D = K \cdot A^n$, where K and n are constants, D is the perpendicular distance to the laser beam and A is a measured amplitude value. The laser-warning arrangement comprises a rotatable optics system with two light inputs, a fixed detector system which detects the magnitude of the light coming in via the light inputs of the rotatable optics system and transmitted through the optics system to the fixed detector system, and an evaluation unit which determines the impact time in accordance with the above equation. The optics system comprises, counting from each light input, a first cylindrical lens, prism, reflector, filter, second cylindrical lens, diaphragm and glass block.

14 Claims, 2 Drawing Sheets

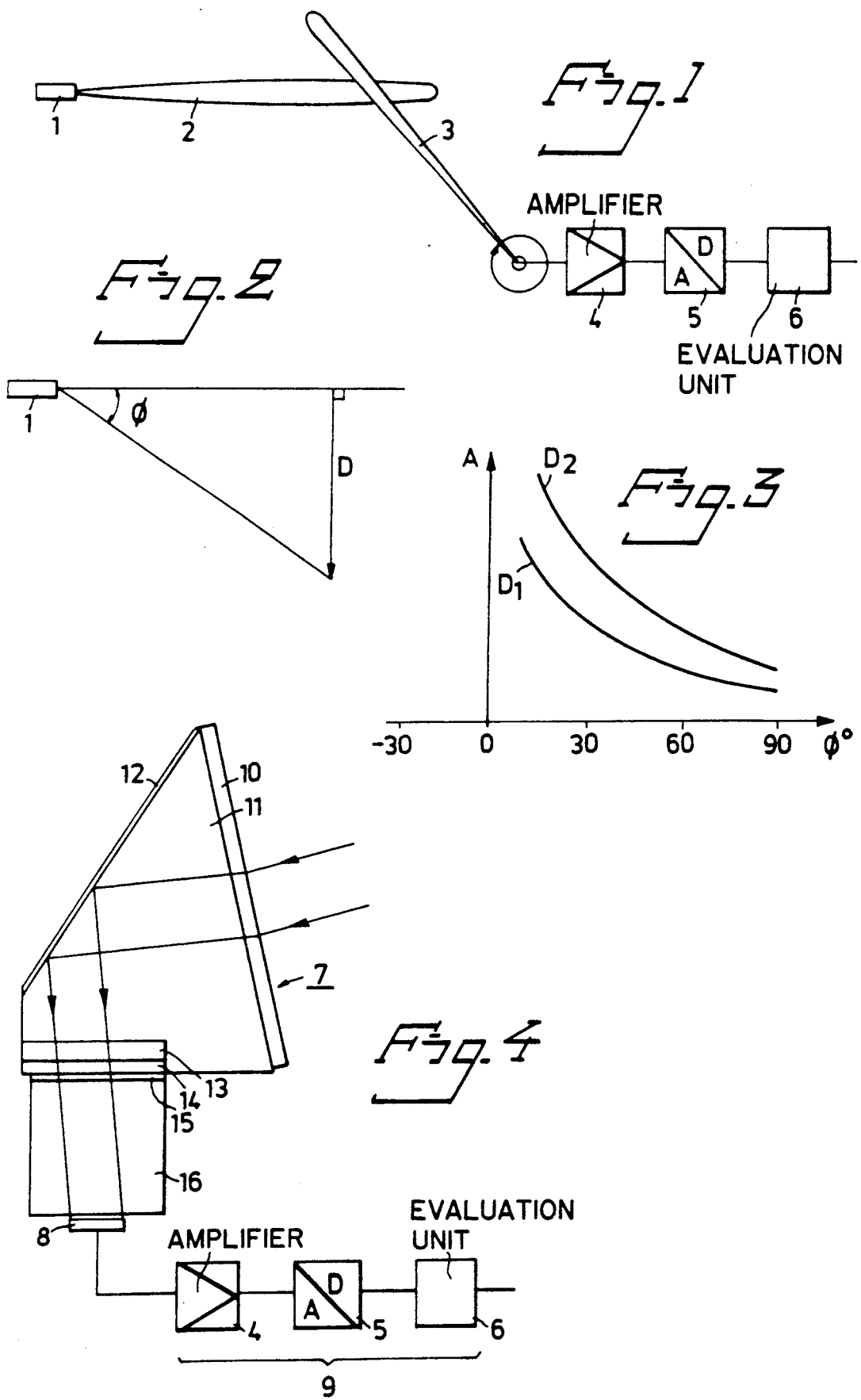

LASER-WARNING METHOD AND APPARATUS

BACKGROUND OF THE INVENTION

The present invention relates to a laser-warning method and a laser-warning apparatus, which is intended to warn of laser light from a laser beam source which is used for guiding projectiles, missiles and the like, for example laser light from a pulsed laser beam which is directed towards a target area.

Laser-warning devices are mounted on tanks for example, with the purpose of warning the crew that they may be exposed to threat. The threat can consist of a rocket which is directed towards its target by a laser pointer.

SUMMARY OF THE INVENTION

The laser-warning apparatus according to the invention detects the light occurring within the scattering area of the laser beam when the pulsed laser beam generated by the laser beam source passes through an air space. Pulsed scattering light can usually be detected within an area extending 50 meters from the laser direction.

It is of great interest to know the time for the laser beam to reach the laser-warning apparatus, the so-called impact time, in the case of a possibly threatening attack in order to assess what measures should and can be taken. Impact times of the order of magnitude of 25 s or more indicate that the risk of attack is not particularly great, since a threat in the form of an attacking weapon will scarcely reach target. No measures need therefore be taken directly, but instead it is possible to wait while tracking the threat. Impact times of more than 25 s probably mean that the threat is intended for another target in the surroundings.

The purpose of the present invention is to provide a method and a laser-warning apparatus for determining the impact time for a laser beam source, which method and apparatus can determine with great reliability the impact time of a threat.

This purpose of the invention is achieved by means of a method which is characterized in that a first amplitude value of the scattered light from the laser beam is measured at a first point in time and a second amplitude value of the scattered light is measured at a second point in time, and the time difference between the first and second points in time is measured. Then, the time required for the laser beam to reach the laser-warning device is calculated from the measured values on the basis that the amplitude raised to a constant is proportional to the distance to the laser beam according to the equation $D = K \cdot A^n$, where K and n are constants, D is the perpendicular distance to the laser beam and A is a measured amplitude value. A laser-warning device includes a rotatable optics system with at least one light input comprising, counting from each light input, a first cylindrical lens, a prism, a reflector, a filter, a second cylindrical lens, a diaphragm and a glass block, which optics system has a given limited lobe breadth in the plane of rotation of the system for the light inputs. The device further includes a fixed detector system which detects the magnitude of the light which comes in via the light inputs of the rotatable optics system and is transmitted through the optics system to the fixed detector system, and an evaluation unit which, on the basis of two time-separated amplitude values detected by the detector system in the laser beam direction, calculates the time for the laser beam to reach the laser-warning arrangement from the detected amplitude values on the basis that the amplitude raised to a constant is proportional to the distance to the laser beam according to the equation $D = K \cdot A^n$, where K and n are constants, D is the perpendicular distance to the laser beam and A is a detected amplitude value.

According to one embodiment the method is characterized in that the time for the laser beam to reach the laser-warning arrangement, the socalled impact time T, is calculated from the measured values according to the following equation: $T = \Delta T / [(A_1/A_2)^n - 1]$, where $\Delta T$ is the time difference between the point in time of a first amplitude value and the point in time of a second amplitude value, $A_1$ is the first amplitude value of a first measurement in the direction of the laser beam source and $A_2$ is the second amplitude value of a second measurement in the direction of the laser beam source, and n is a constant such that $-1.0 < n < -0.9$.

According to another advantageous embodiment of the method, the sign for the equation $T = \Delta T / [(A_1/A_2)^n - 1]$ is also examined. A positive value for the equation indicates that the threat, or the actual laser beam, is approaching, while a negative value indicates that the threat is moving away from the observer. The sign information provides an indication of how the impact times may be altered upon coming measurements. The preferred method is characterized in that the sign for the equation $T = \Delta T / [(A_1/A_2)^n - 1]$ which indicates the impact time is examined in order to determine the movement of the threat in relation to the observer and to obtain an indication of impact times for subsequent measurements, in which respect a positive value indicates that the threat is approaching the observer, while a negative value indicates that the threat is moving away from the observer.

According to one advantageous embodiment of the laser-warning apparatus, it is characterized in that the time for the laser beam to reach the laser-warning arrangement, the so-called impact time (T), is calculated from the detected amplitude values according to the equation $T = \Delta T / [(A_1/A_2)^n - 1]$, where $\Delta T$ is the time difference between the point in time of a first amplitude value and the point in time of a second amplitude value, $A_1$ is the first amplitude value of a first measurement in the direction of the laser beam source and $A_2$ is the second amplitude value of a second measurement in the direction of the laser beam source, and n is a constant such that $-1.0 < n < -0.9$.

According to another advantageous embodiment of a laser-warning apparatus according to the present invention provided with two light inputs, it is characterized in that the filter, second cylindrical lens, diaphragm and glass block which are included in the rotatable optics system are common to the two light inputs and in that the detector system consists of a fixed detector. This embodiment affords a saving in the number of included components, which can be advantageous from the cost viewpoint.

In certain cases it can be advantageous to have an optics system made up of two completely separate parts with a fixed detector for each one of the separate parts. A separation of the optics system into two parts means, among other things, that the same high sensitivity as with an optics system with one light input can be maintained, and there are no problems in keeping apart two laser beam sources transmitting within the same interval. A laser-warning apparatus with two light inputs is characterized in that the optics system is made up of two completely separate parts which are designed to cooperate each with one light input, and in that the detector system comprises a fixed detector for each one of the separate parts.

By providing the optics system with two or more light inputs and, thus, the same number of receiver lobes, a laser-warning apparatus can be obtained which permits faster determination of the impact time for a laser beam source.

BRIEF DESCRIPTION OF THE PREFERRED EMBODIMENTS

The invention will be described in greater detail below with reference to the attached drawings, in which FIG. 1 schematically illustrates a method according to the present invention for determining the impact time, FIG. 2 shows a definition of distance and scattering angle, FIG. 3 shows the amplitude values as a function of the scattering angle according to FIG. 2 for two different perpendicular distances to the laser beam, FIG. 4 shows a first exemplary embodiment of a laser-warning apparatus according to the present invention for determining the impact time, FIG. 5 shows a second exemplary embodiment of a laser-warning apparatus according to the invention for determining the impact time, and FIG. 6 shows a third exemplary embodiment of a laser-warning apparatus according to the present invention for determining the impact time.

DETAILED DESCRIPTION OF THE DRAWINGS

Figure 5:
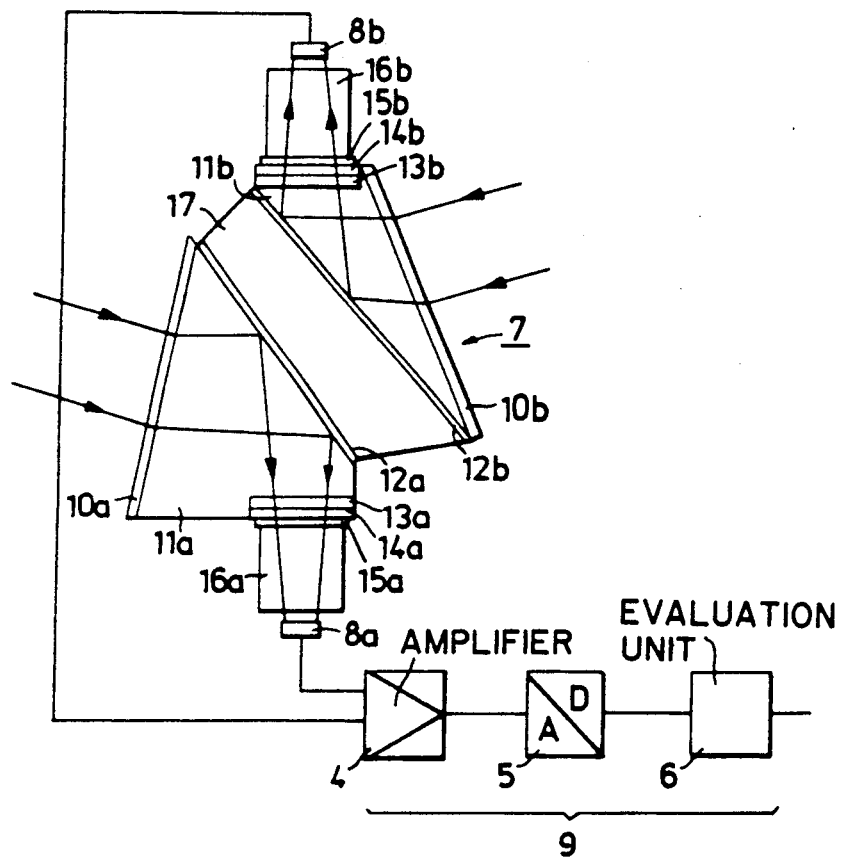

According to FIG. 1 a receiver lobe 3 is rotated in a plane of rotation, preferably the horizontal plane. The receiver lobe has a given limited lobe breadth in the horizontal plane. When the transmitter lobe 2 of a laser beam source 1 coincides with the sensitivity lobe, the light which is generated by the pulsed laser beam emitted by the laser beam source and which occurs within the scattering area of the laser beam is detected by the receiver lobe. In one embodiment a series of pulses is received each time the receiver lobe sweeps past the laser beam source, which can normally be achieved at a rate of rotation of the optics system of about ⅓ turn/s.

The received pulses are amplified in an amplifier 4 and are then preferably converted from analog pulses to digital signals in an analog-to-digital convertor 5, which digital signals are processed in an evaluation unit 6. On the basis of the received pulses, the evaluation unit 6 establishes a value for the impact time. The amplitudes of the pulses received at each turn are thus used to establish an amplitude value which can be incorporated in an equation from which the impact time is calculated. The greatest amplitude value for a measurement can thus advantageously be used for calculating the impact time. In order to shorten the time required for measurement and for establishing two amplitude values which are required for calculation of the equation for the impact time, which normally corresponds to two rotational turns of the receiver lobe, the rotatable optics system can be provided with two inputs and, thus, two receiver lobes. In this way the time for establishing the necessary amplitude values can be reduced to half.

Tests supported by practical experiments have shown that the amplitude A raised to a constant n is proportional to the distance D to the laser beam. The following equation can therefore be set up:

$$D = K \cdot A^n \quad (1)$$

where n is a constant such that $-1.0 < n < -0.9$. The definition of D is shown in FIG. 2 in which reference number 1 refers to the laser beam source and the apparatus according to the present invention is situated at the tip of distance arrow D. If the variables associated with a first measurement are indicated by 1 as lower index and the variables associated with a second measurement are indicated by 2 as lower index, the following equations can be set up:

$$D_1 = K \cdot A_1^n \quad (2)$$

$$D_2 = K \cdot A_2^n \quad (3)$$

where K is a constant whose value need not be known. By division of the two equations and abbreviating, the following is obtained:

$$D_1/D_2 = (A_1/A_2)^n \quad (4)$$

For the distance difference $\Delta D$ between two measurements, the following applies:

$$\Delta D = D_1 - D_2 \quad (5)$$

An equation between the time between two measurements $\Delta T$ and the (approach) velocity V of the laser beam source can then be set up as follows:

$$V = \Delta D / \Delta T \quad (6)$$

The impact time T from the point in time of measurement 2 can be written:

$$T = D_2/V = D_2 \cdot \Delta T/\Delta D = D_2/(D_1 - D_2) \cdot \Delta T = \Delta T/(D_1/D_2 - 1) \quad (7)$$

By introducing equation (4) into equation (7), the following is obtained:

$$T = \Delta T/[(A_1/A_2)^n - 1] \quad (8)$$

Knowing the amplitude of two measurements and the time between these two measurements, the evaluation circuit can calculate the impact time T.

In FIG. 3 the amplitude A is shown as a function of the scattering angle $\phi$ for two different perpendicular distances $D_1$ and $D_2$.

A first preferred embodiment of a laser-warning apparatus for determining the impact time is shown in FIG. 4. The laser-warning apparatus includes a rotatable optics system 7, a fixed detector 8 and an evaluation part 9. The optics system is made up of a cylindrical lens 10 which receives incident light, which can originate from a laser beam source, and whose cylinder axis lies essentially in the plane of the drawing. The main task of the cylindrical lens 10 is to form the receiver lobe of the rotating optics system with a lobe breadth in the horizontal plane of for example 10°. The cylindrical lens 10 is arranged on the input surface of a prism 11. A reflector 12 is arranged on a second surface of the prism 11, and on a third surface, the output surface of the prism, there is a filter 13. A laser beam incident on the input surface of the prism passes through the prism 11 and is reflected on the reflector 12 in order to then leave the prism 11 through the output surface. The filter 13 limits the wavelength range to be considered and has preferably a transmission width of <50 nm at a wavelength range of incident laser light of the order of magnitude of 1 μm. When the laser light has passed the filter 13, the light passes through a second cylindrical lens 14, a diaphragm 15 and a glass block 16 and finally strikes the fixed detector 8. The cylindrical lenses 10 and 14, which both have their cylinder axes essentially in the plane of the drawing, have light-collecting tasks. The diaphragm 15, together with the first cylindrical lens 10, essentially defines the form of the sensitivity lobe. The prism and glass block contribute to a favorable field of view in the vertical direction. The optics system described affords an even distribution of the received energy across the whole surface of the detector 8. The output signal from the detector 8 is coupled to an evaluation part 9 in which there is an amplifier 4, an analog-to-digital convertor 5 and an evaluation unit 6. On the basis of two signal amplitude values measured during two consecutive rotational turns of the rotatable optics system in the direction of the laser beam source, the evaluation unit 6 calculates the impact time T according to the equation $T = \Delta T/[(A_1/A_2)^n - 1]$, where $\Delta T$ is the time difference between the point in time of the first amplitude value and the point in time of a second amplitude value, $A_1$ is the first amplitude value of a first measurement in the direction of the laser beam source and $A_2$ is the second amplitude value of a second measurement in the direction of the laser beam source, and n is a constant such that $-1.0 < n < -0.9$.

The light which is detected by the detector 8 can have a strength which varies very considerably. In order to be able to deal with such variations in strength, that is to say a large dynamics range, parts of the detector can be provided with damping arrangements so that the damped part of the detector contributes to the output signal of the detector when the incident radiation exceeds the saturation value for the non-damped detector part. In this context reference is made in particular to U.S. Pat. No. 3,193,687 and U.S. Pat. No. 3,962,577.

A second preferred embodiment of a laser-warning arrangement for determining the impact time is shown in FIG. 5. The laser-warning apparatus includes a rotatable optics system 7, fixed detectors 8a and 8b and an evaluation part 9. The rotatable optics system 7 is divided up into two separate parts a, b which are each made up of a cylindrical lens 10a/10b which receives incident light, which can originate from a laser beam source. The main task of the cylindrical lens 10a/10b is to form the receiver lobe of the rotatable optics system with a lobe breadth in the horizontal plane of for example 10°. The cylindrical lens is arranged on the input surface of a prism 11a/11b with the cylinder axis essentially in the plane of the drawing. A reflector 12a/12b is arranged on a second surface of the prism 11a/11b, and on a third surface, the output surface of the prism, there is a filter 13a/13b. The two separate parts a, b are separated by a block 17. A light beam incident on the input surface of the prism passes through the prism 11a/11b and is reflected on the reflector 12a/12b in order to then leave the prism 11a/11b through the output surface. The filter 13a/13b limits the wavelength range to be considered and preferably has, as in the preceding preferred embodiment, a transmission width of <50 nm at a wavelength range of incident laser light of the order of magnitude of 1 μm. When the laser light has passed the filter 13a/13b, the light passes through a second cylindrical lens 14a/14b, a diaphragm 15a/15b and a glass block 16a/16b in order to finally strike the fixed detector 8a/8b. The cylindrical lenses 10/10b and 14a/14b have light-collecting tasks and have their cylinder axes substantially in the plane of the drawing. The diaphragm 15a/15b, together with the first cylindrical lens 10a/10b, essentially defines the form of the sensitivity lobe. The prism and glass block contribute to a favorable field of view in the vertical direction. The optics system described affords an even distribution of the received energy across the whole surfaces of the detectors 8a, 8b. The output signal from the detectors 8a, 8b is coupled to an evaluation part 9 in which there is an amplifier 4, an analog-to-digital convertor 5 and an evaluation unit 6. The evaluation unit 6 establishes the signal amplitude values for each rotational turn of the rotatable optics system in the direction of the laser beam source and performs a calculation of the impact time T according to the equation $T = \Delta T/[(A_1/A_2)^n - 1]$ where $\Delta T$ is the time difference between the point in time of a first amplitude value and the point in time of a second amplitude value, $A_1$ is the first amplitude value of a first measurement in the direction of the laser beam source and $A_2$ is the second amplitude value of a second measurement in the direction of the laser beam source, and n is a constant such that $-1.0 < n < -0.9$.

Figure 6:
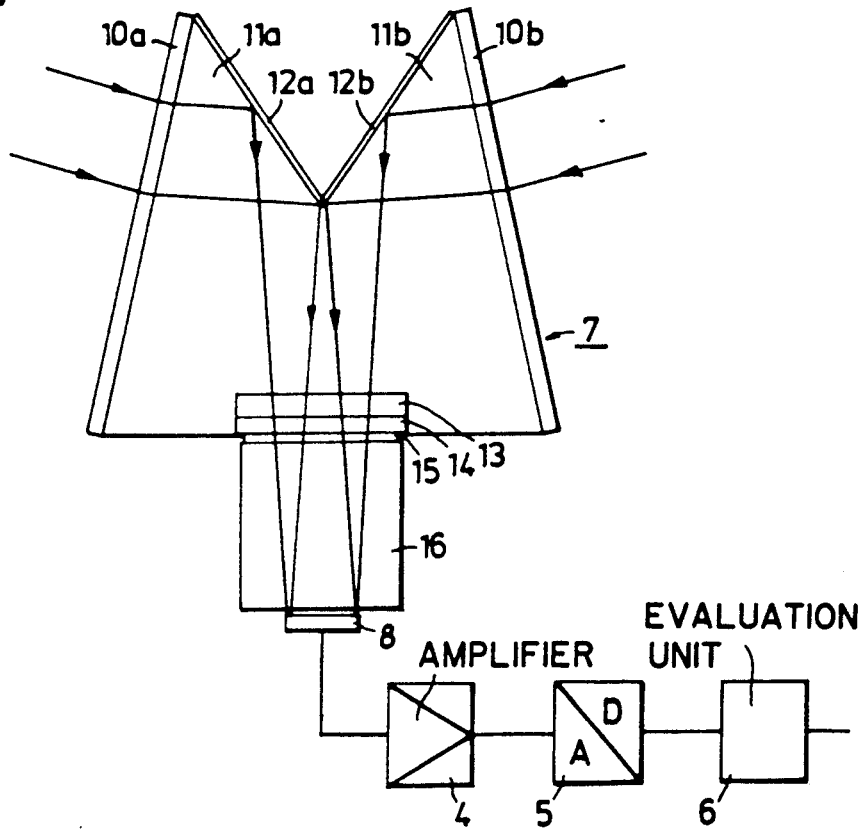

FIG. 6 shows a third preferred embodiment of a laser-warning apparatus for determining the impact time for a laser beam source. The laser-warning arrangement includes a rotatable optics system 7, a fixed detector 8 and an evaluation part 9. The optics system has two light inputs. From the light inputs, the light is conveyed towards the fixed detector 8 via a separate part for each light input comprising a first cylindrical lens 10a/10b, a prism 11a/11b and a reflector 12a/12b, and a common part comprising a filter 13, second cylindrical lens 14, diaphragm 15 and glass block 16. The incident light is detected here in a single detector, in contrast to the embodiment according to FIG. 5. This means that the construction requires fewer components. In FIG. 6 the input surfaces have been shown turned 180° relative to each other in the plane of rotation, primarily for purposes of clarification. In the case where a common detector is used and a rotatable optics system with partly common components, a 180° relative turn is normally not suitable, since it is not possible to determine on which light input the incoming light is incident. By changing the relative turning to a value different from 180°, for example 135°, this problem can be avoided.

In order to prevent reflection-susceptible objects in the vicinity of the laser-warning apparatus from interfering with the laser-warning apparatus for determining the impact time, it is possible to arrange around the warning device a casing (not shown) provided with maskings which prevents reflections from the reflection-susceptible objects. An example of a reflection-susceptible object is the turret of a submarine.

I claim:

1. A laser-warning method for warning of laser light in the form of laser beams directed towards a target area from a laser beam source which is used for guiding projectiles, missiles and other laser guided means, said method comprising the steps of:

measuring in the direction of the laser beam source a first amplitude value of a scattered light from the laser beam at a first point in time;

measuring a second amplitude value of the scattered light at a second point in time;

measuring the time difference between said first and second points in time; and calculating the impact time T, which is the time for the laser beam to reach a laser-warning device, based on measured values according to the following equation:

$$T = \Delta T / [(A_1/A_2)^n - 1],$$

wherein $\Delta T$ is the time difference between the point in time of the first amplitude value and the point in time of the second amplitude value, $A_1$ is the first amplitude value, $A_2$ is the second amplitude value, and n is a constant.

2. A laser-warning method to claim 1, wherein the greatest amplitude value of a measurement is used to calculate the time for the laser beam to reach the laser-warning apparatus.

3. A laser-warning method according to claim 1, wherein n is a constant such that $-1.0 < n < -0.9$.

4. A laser-warning method according to claim 3, wherein the greatest amplitude value of a measurement is used to calculate the time for the laser beam to reach the laser-warning arrangement.

5. A laser-warning method according to claim 3, wherein the sign for the equation: $T = \Delta T / [(A_1/A_2)^n - 1]$ which indicates the impact time is examined in order to determine the movement of a threat in relation to an observer and to obtain an indication of impact times for subsequent measurements, wherein a positive value indicates that the threat is approaching the observer, while a negative value indicates that the threat is moving away from the observer.

6. A laser-warning method according to claim 5, wherein the greatest amplitude value of a measurement is used to calculate the time for the laser beam to reach the laser-warning arrangement.

7. A laser-warning apparatus for warning of laser light in the form of laser beams from a laser beam source which is used for guiding projectiles, missiles and other laser guided means, said apparatus comprising:

a rotatable optics system with at least one light input including counting from each light input, a first cylindrical lens, a prism, a reflector, a filter, a second cylindrical lens, a diaphragm and a glass block, said rotatable optics system having a given limited lobe breadth in the plane of rotation for the light inputs;

a fixed detector system for detecting the magnitude of the light received through the light inputs of the rotatable optics system and transmitted through the optics system to the fixed detector system; and an evaluation unit which, on the basis of two time-separated amplitude values detected by the detector system in the direction of the laser beam source in a first and a second measurement, respectively, calculates the impact time T, which is the time necessary for the laser beam to reach the laser warning apparatus, from the detected amplitude values according to the equation $T = \Delta T / [(A_1/A_2)^n - 1]$, wherein $\Delta T$ is the time difference between the point in time of a first amplitude value and the point in time of a second amplitude value, $A_1$ is the first amplitude value, $A_2$ is the second amplitude value and n is a constant.

8. A laser-warning apparatus according to claim 7, wherein n is a constant such that $-1.0 < n < -0.9$.

9. A laser-warning apparatus according to claim 8, wherein the optics system is provided with two light inputs.

10. A laser-warning apparatus according to claim 7, wherein said first cylindrical lens which receives said light from said laser beam source is positioned on a first input surface of said prism, said reflector is arranged on a second surface of said prism, and said filter is arranged on a third output surface of said prism.

11. A laser-warning apparatus according to claim 7, wherein the optics system is provided with two light inputs.

12. A laser-warning apparatus according to claim 11, wherein the filter, second cylindrical lens, diaphragm and glass block which are included in the rotatable optics system are common to the two light inputs and the detector system consists of a single fixed detector.

13. A laser-warning apparatus according to claim 11, wherein the rotatable optics system is made up of two completely separate parts which are designed to cooperate each with a light input, and wherein the detector system comprises a fixed detector for each of the separate parts.

14. A laser-warning apparatus according to claim 13, wherein the light inputs in the plane of rotation of the rotatable optics system are turned 180° relative to each other.

* * * * *